US008763908B1

(12) United States Patent
Feldman et al.

(10) Patent No.: US 8,763,908 B1
(45) Date of Patent: Jul. 1, 2014

(54) DETECTING OBJECTS IN IMAGES USING IMAGE GRADIENTS

(75) Inventors: Bryan E. Feldman, San Francisco, CA (US); Arnab S. Dhua, Mountain View, CA (US); Nalin Pradeep Senthamil, Santa Clara, CA (US)

(73) Assignee: A9.com, Inc., Palo Alto, CA (US)

( * ) Notice: Subject to any disclaimer, the term of this patent is extended or adjusted under 35 U.S.C. 154(b) by 165 days.

(21) Appl. No.: 13/431,864

(22) Filed: Mar. 27, 2012

(51) Int. Cl.
*G06K 7/10* (2006.01)

(52) U.S. Cl.
USPC .................. 235/462.09; 235/472.01

(58) Field of Classification Search
USPC ............. 235/462.01–462.45, 472.01, 472.02, 235/472.03
See application file for complete search history.

(56) References Cited

U.S. PATENT DOCUMENTS

| | | | |
|---|---|---|---|
| 5,621,467 A | * | 4/1997 | Chien et al. ............... 375/240.15 |
| 8,494,268 B2 | * | 7/2013 | Soderberg et al. ............ 382/181 |
| 2011/0158538 A1 | * | 6/2011 | Iwamoto et al. .............. 382/192 |
| 2011/0286628 A1 | * | 11/2011 | Goncalves et al. ........... 382/103 |
| 2013/0193211 A1 | * | 8/2013 | Baqai et al. .............. 235/462.04 |

* cited by examiner

*Primary Examiner* — Thien M Le

(74) *Attorney, Agent, or Firm* — Novak Druce Connolly Bove + Quigg LLP

(57) ABSTRACT

The present technology relates to methods, systems and computer program products for detecting objects in images captured by a camera of a mobile device. The detection of objects (such as barcodes, QR codes, and text) in images can be based at least in part on image gradients of the image. The image can be divided into a plurality of regions, each having a dominant gradient direction. Based at least in part on the dominant gradient directions of the regions satisfying orientation thresholds, the regions can be identified as candidate or non-candidate regions for corresponding to a predetermined object. The candidate regions can be merged if they satisfy a connecting criterion. The merged regions can then be analyzed to determine if the merged regions satisfy a geometric property of the predetermined object, such as having a rectangular shape substantially similar to that of a barcode.

25 Claims, 7 Drawing Sheets

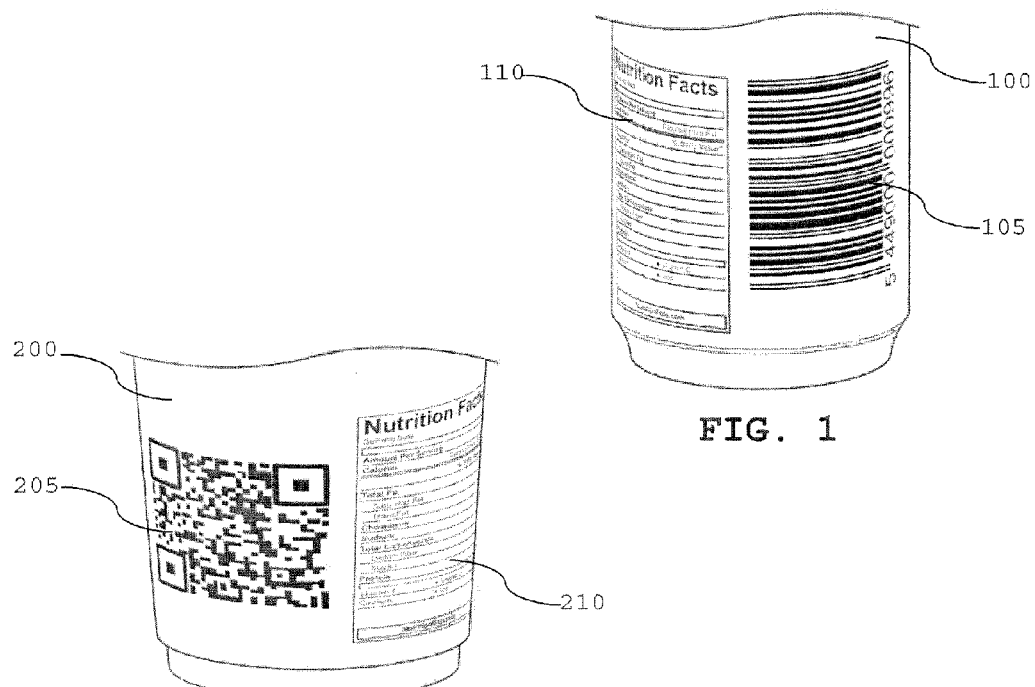
FIG. 1
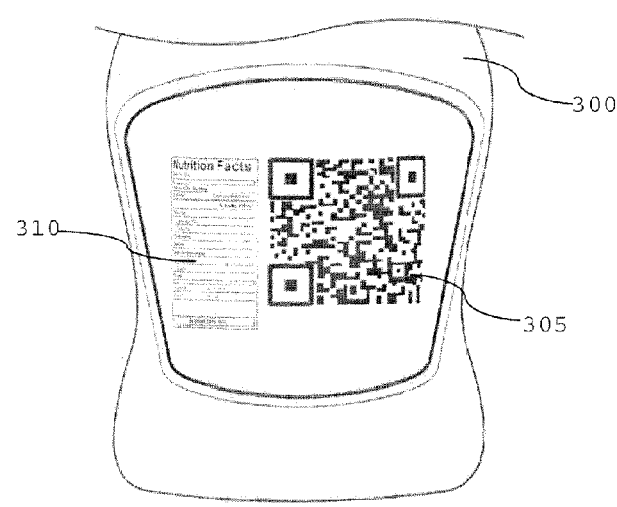
FIG. 2
FIG. 3

DETECTING OBJECTS IN IMAGES USING IMAGE GRADIENTS

BACKGROUND

Images produced by cameras on mobile electronic devices such as cell phones and personal digital assistants (PDAs) are often of poor quality because cameras of the mobile electronic devices have inexpensive optics, small apertures, slow shutters and in many cases fixed-focus lenses. Such cameras often show blur (both motion and focus blur) and noise. Moreover, in situations where the lenses are close to the object, the depth of field is poor and the blur problem grows worse with the introduction of varying amounts of blur through the images produced by different lenses. Illumination variations are an additional problem and cannot be rectified easily using the flash on cell phone cameras, since the flash on these devices is usually not strong enough and tends to create illumination variations.

Some efforts have been made to identify objects captured in images produced by cameras of poor quality. However, conventional systems for detecting objects captured by such images are often complex and require extensive computation by the processor of the camera device. One type of conventional system uses a number of filters that each analyze and process the image for objects associated with that filter. However, such system utilizes a large amount of processing power. There is, therefore, a need for a robust and efficient method and system for detecting predetermined objects in images of varying quality produced by mobile electronic devices such as cell phones and PDAs.

BRIEF DESCRIPTION OF THE DRAWINGS

The embodiments of the present technology will hereinafter be described in conjunction with the appended drawings, provided to illustrate and not to limit the technology, wherein like designations denote like elements, and in which:

FIGS. 1-3 are illustrations of example subjects which can be captured in images, where the subjects include predetermined objects such as barcodes, QR codes, and text, in accordance with an embodiment of the present technology;

DETAILED DESCRIPTION OF THE TECHNOLOGY

Figure 4:
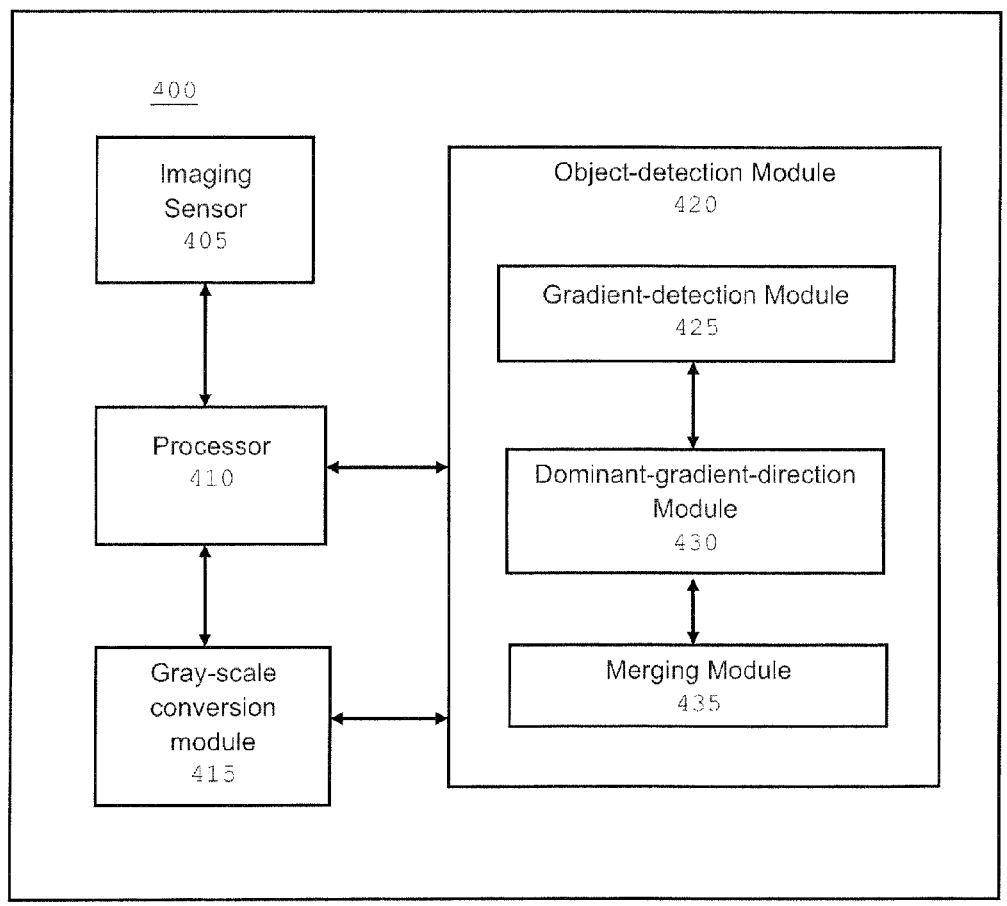
FIG. 4 is a block diagram illustrating a system for detecting objects in images using image gradients, in accordance with an example embodiment of the present technology.

Various embodiments of the present technology relate to methods, systems and computer program products for detecting predetermined objects in images, captured by cameras or scanners having limited computation resources, using image gradients.

As the functionality of mobile devices equipped with cameras increases, the ability to detect and locate various objects of an image rapidly and robustly is desired as such mobile devices can have limited computational resources. Such mobile devices equipped with cameras can include smartphones, mobile phones, tablet computers, personal computers, netbook computers, handheld or pocket-sized cameras, or any other electronic device that is capable of capturing images. For example, captured images of non-flat subjects (for example, cans 100 (shown in FIG. 1), cups 200 (shown in FIG. 2), jars 300 (shown in FIG. 3), cylindrical objects, rounded objects, or any other similar non-flat subjects) can complicate the ability to quickly detect and locate predetermined objects such as barcodes 105 (shown in FIG. 1), quick response (QR) codes 205, 305 (shown in FIGS. 2 and 3), and text 110, 210, 310 (shown in FIGS. 1-3) printed on the non-flat subject. The presently disclosed methods, systems and computer program products for detecting predetermined objects in images identify objects in the images based at least in part on the gradients of the image. By analyzing the gradients of the image, a region can be quickly identified as corresponding to a predetermined image object, and the image can be transmitted to an appropriate decoding module for efficient decoding of the predetermined image object of the image.

According to one embodiment of the present disclosure, a method, system and computer program product for detecting objects in images, using the images' gradients, can include capturing, via a camera of an electronic device, an image of a subject containing predetermined objects. The captured image can be processed by one or more processors or processing systems communicatively coupled to the electronic device to detect and locate predetermined objects in the image. For example, predetermined objects can include a barcode, a quick response (QR) code, and text. The one or more processors or processing systems can analyze the gradients of at least one region of the image to determine a dominant gradient direction of the region of the image. Based on the dominant gradient direction of the region of the image, the region can be identified as a candidate region. That is, the region can be identified as a candidate region for corresponding to a predetermined object. If a plurality of candidate regions is identified, the candidate regions can be connected if the candidate regions meet a connection criterion. The connection criterion can be a dominant orientation threshold associated with the difference between the dominant gradient directions of adjacent candidate regions. For example, if the difference between the dominant gradient directions of adjacent candidate regions satisfy (for example are less than) a dominant orientation threshold, the adjacent candidate regions can be connected. The connected candidate regions can yield a connected region. A determination can then be made that the connected region corresponds to a predetermined object if the connected region satisfies a geometric property of the predetermined object. For example, a predetermined object that is a barcode can have a geometric property of being substantially rectangular in shape. Therefore, a determination can be made that a connected region corresponds to a barcode if the connected region is substantially rectangular in shape.

With the predetermined object identified, the image can be efficiently processed and analyzed. When the image is determined to contain a predetermined object, an appropriate decoding module can then be applied to decode any text or code associated with the predetermined object. Additionally, the presently disclosed methods, systems and computer program products for detecting objects in images allow for the detection and localization of predetermined objects at various ranges of scales, as the image is analyzed on a region-by-region basis. Also, the presently disclosed method, system and computer program product for detecting objects in images can be independent of the input image size, thereby allowing for a wide range of applications, such as offline processing on a high performance computer and real time processing on a limited computation resource device (for example, a mobile camera phone).

Details pertaining to methods, systems and computer program products for detecting objects in an image will be described in further detail below and will reference FIGS. 1-8.

FIGS. 1-3 illustrate subjects which can be captured by cameras. FIG. 1 illustrates a subject that is a can 100. The can 100 can have predetermined objects 105, 110 printed thereon. For example, in FIG. 1, the predetermined objects can include a barcode 105 and text 110 printed thereon. FIG. 2 illustrates another subject that is a cup 200. The cup 200 can have predetermined objects printed thereon. In FIG. 2, the predetermined objects can include a QR code 205 and text 210. FIG. 3 illustrates another subject that is a jar 300. The jar 300 can have predetermined objects 305, 310 printed thereon. In FIG. 3, the predetermined objects can include a QR code 305 and text 310. Those of ordinary skill in the art will appreciate that the subjects illustrated in FIGS. 1-3 can be any other subject such as a box, a book, a bottle, or any other flat or non-flat subject. Those of ordinary skill in the art will also appreciate that the predetermined objects illustrated in FIGS. 1-3 can be any other predetermined object and can have any other combination of predetermined objects or no predetermined objects printed thereon. For purposes of brevity, the following disclosure will discuss a subject having a predetermined object that is a barcode 105 similar to that illustrated in FIG. 1; however, those of ordinary skill in the art will appreciate that the methods, systems, and computer program products described below can be equally applied for predetermined objects such as QR codes 205, 305, text 110, 210, 310, or any other predetermined object to achieve the technical advantages of the present disclosure.

FIG. 4 is a block diagram of an electronic device configured to capture images. In FIG. 4, the electronic device 400 can be a mobile phone, a smartphone, a mobile computer, a netbook computer, a personal digital assistant (PDA), a tablet computer, a handheld or pocket-sized camera, or any other electronic device configured to capture images.

In FIG. 4, the electronic device 400 can include an image sensor 405. The image sensor 405 can include the camera of the electronic device 400. In another embodiment, the image sensor 405 can include the sensor that converts an optical image into an electronic signal. For example, a charge-coupled device (CCD), a complementary Metal-oxide-semiconductor (CMOS) sensor, or any other image sensor adapted to capture images. When an image is received, captured, or otherwise detected by the image sensor 405, the image can be transmitted to a processor 410 of the electronic device 400.

The processor 410 can be communicatively coupled to the electronic device 400. The processor 410 can include one or more processors. In other embodiments, the processor 410 can be a processing system, a computing system, or any other system that is communicatively coupled to the electronic device 400 that can receive and process images captured by the electronic device 400.

The electronic device 400 can include one or more image processing modules 415, 420 that are communicatively coupled with the processor 410 to process the content (such as objects) of the captured image. Those of ordinary skill in the art will appreciate that such modules can control or be configured to control the processor 410 to perform various actions. The modules 415, 420 can be located in a local memory storage device, a remote memory storage device, or both a local memory storage device and a remote memory storage device that are communicatively coupled to the electronic device 400.

In at least one embodiment, the image processing modules can include a gray-scale conversion module 415. The gray-scale conversion module 415 can convert images captured by the image sensor into a gray-scale image. In the present disclosure, the identification of predetermined objects in the image is based at least in part on the gradients of the image. Thus, by converting the images to gray-scale, the gray-scaled image can enhance the detection and determination of the gradients of the image. Those of ordinary skill in the art will appreciate, however, that the image need not be converted into gray-scale to determine the gradients of the image. That is, those of ordinary skill in the art will appreciate that the gray-scale conversion module 415 can be optionally included.

As illustrated in FIG. 4, the electronic device 400 can include an image processing module that is an object-detection module 420. The object-detection module 420 can be communicatively coupled with the processor 410 to process the content of the captured image. For example, the object-detection module 420 can analyze the captured image to determine if the image contains a predetermined object (for example, a barcode, a QR code, or text). The object-detection module 420 can divide a captured image into a plurality of regions. The object-detection module 420 can then analyze each region and determine whether the region is a candidate region that is a candidate for corresponding to or containing a predetermined object. In at least one embodiment, the object-detection module 420 can include additional modules. For example, in FIG. 4, the object-detection module 420 can include a gradient-detection module 425, a dominant-gradient-direction module 430, and a merging module 440.

The gradient-detection module 425 can be configured to determine the gradients of a pixel, a region, the entire image, or any portion of the image. In at least one embodiment, the gradient-detection module 425 can detect or determine which pixels within a region or a portion of the image are edge pixels. That is, the gradient-detection module 425 can identify the edges of objects in an image. The edge pixels of the object in the image can assist in determining whether the region associated with the edge pixels correspond to a predetermined object, as will be described in further detail below with respect to FIGS. 5 and 6.

The dominant-gradient-direction module 435 can be configured to determine the dominant direction of the gradients detected by the gradient-detection module 425. For example, the dominant-gradient-direction module 435 can determine if the orientation of the gradients is substantially constant in one direction. That is, the dominant-gradient-direction module 435 can determine if the gradients of the image (or portion of the image, region of the image, or other area of the image) are substantially oriented in a same direction (for example, on a same line or such that the gradients are substantially co-linear with one another). The dominant-gradient-direction module 435 can also determine if the gradients of the image are oriented such that the gradients are substantially constant in a first direction and a second direction, where the first direction and the second direction are one-hundred-eighty-degrees to one another, ninety-degrees to one another, forty-five degrees to one another, or any other orientation with respect to one another. The dominant gradient direction determined by the dominant-gradient-direction module 435 can allow for the determination of whether the regions of the image corresponding to the dominant gradient direction correspond to a predetermined object. For example, a determination can be made as to whether the gradients of the portion of the image deviate from the dominant gradient orientation. For predetermined objects that are barcodes, the gradients will not substantially deviate from the dominant gradient direction. Thus, for regions of the image having gradients that do not substantially deviate from the gradient direction, the regions can be identified as possibly corresponding to a barcode. Substantial deviation from the gradient direction can be determined by a deviation threshold. That is, the deviation threshold can be a minimum value that the gradient can deviate from the dominant gradient direction to be considered as substantially deviating from the dominant gradient direction. In another way, the deviation threshold can be the maximum value that the gradient can deviate from the dominant gradient direction to be considered as not deviating from the dominant gradient direction. Further details as to the applicability of dominant gradient directions in detecting predetermined objects in an image will be discussed below with respect to FIGS. 5 and 6.

The merging module 435 or a connecting module can merge adjacent regions of an image which have been identified as possibly corresponding to predetermined objects (that is, candidate regions of the image). In at least on embodiment, the merging module 435 can merge adjacent regions of an image based on a merging criterion or connecting criterion. For example, the merging module 435 can merge adjacent regions if a difference between the respective dominant gradient directions of the adjacent regions is less than (or equal to) a merging threshold or connecting threshold to yield a merged region or a connected region. In such an embodiment, that the difference between the respective dominant gradient directions of the adjacent regions is less than a merging threshold can indicate that the adjacent regions contain substantially similar gradients and likely substantially similar content. That is, the adjacent regions are likely to be regions of a similar object of an image, such as a predetermined object. The merging module 435 can then build upon the merged or connected regions and compare further adjacent regions to the merged or connected regions if the difference between the dominant gradient directions thereof is less than the merging threshold. The merging module 435 can stop merging adjacent regions of the image and stop merging further adjacent regions to the merged region when the dominant gradient directions thereof are greater than or equal to the merging threshold. Such a determination can indicate that the content of the adjacent regions are dissimilar, unrelated, or otherwise not likely to correspond to a same object. After the merging module 435 stops merging further adjacent regions to the merged region or connected region, the merged region or connected region can then be analyzed to determine if the merged region or connected region satisfies at least one geometric property associated with the predetermined object, as will be described in further detail below with respect to FIGS. 5-6.

Figure 5:
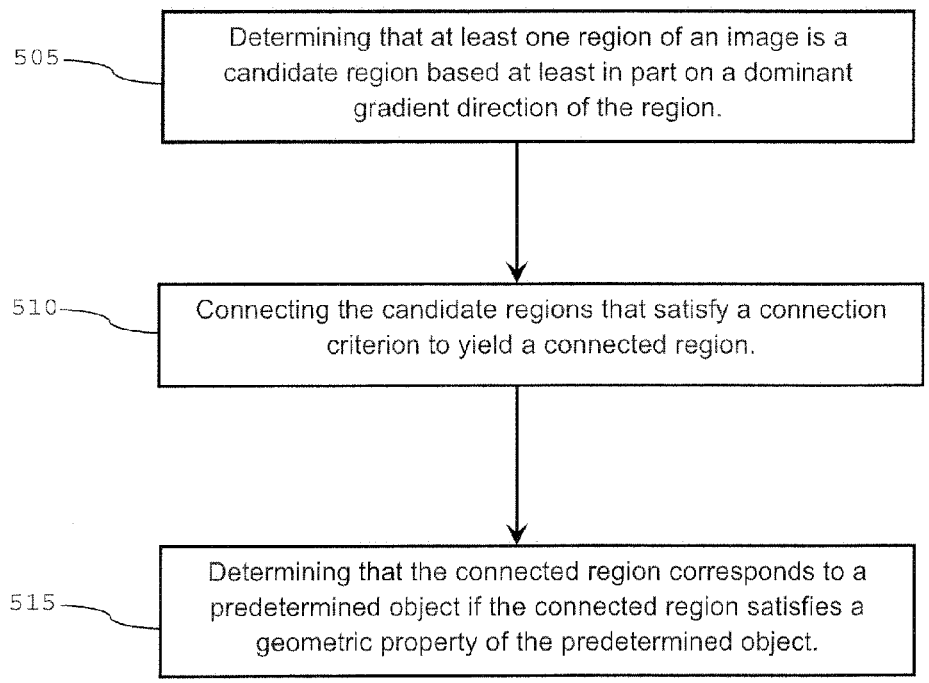
FIG. 5 is a flow chart of a method of detecting objects in images using image gradients, in accordance with an example embodiment of the present technology.
Figure 6:
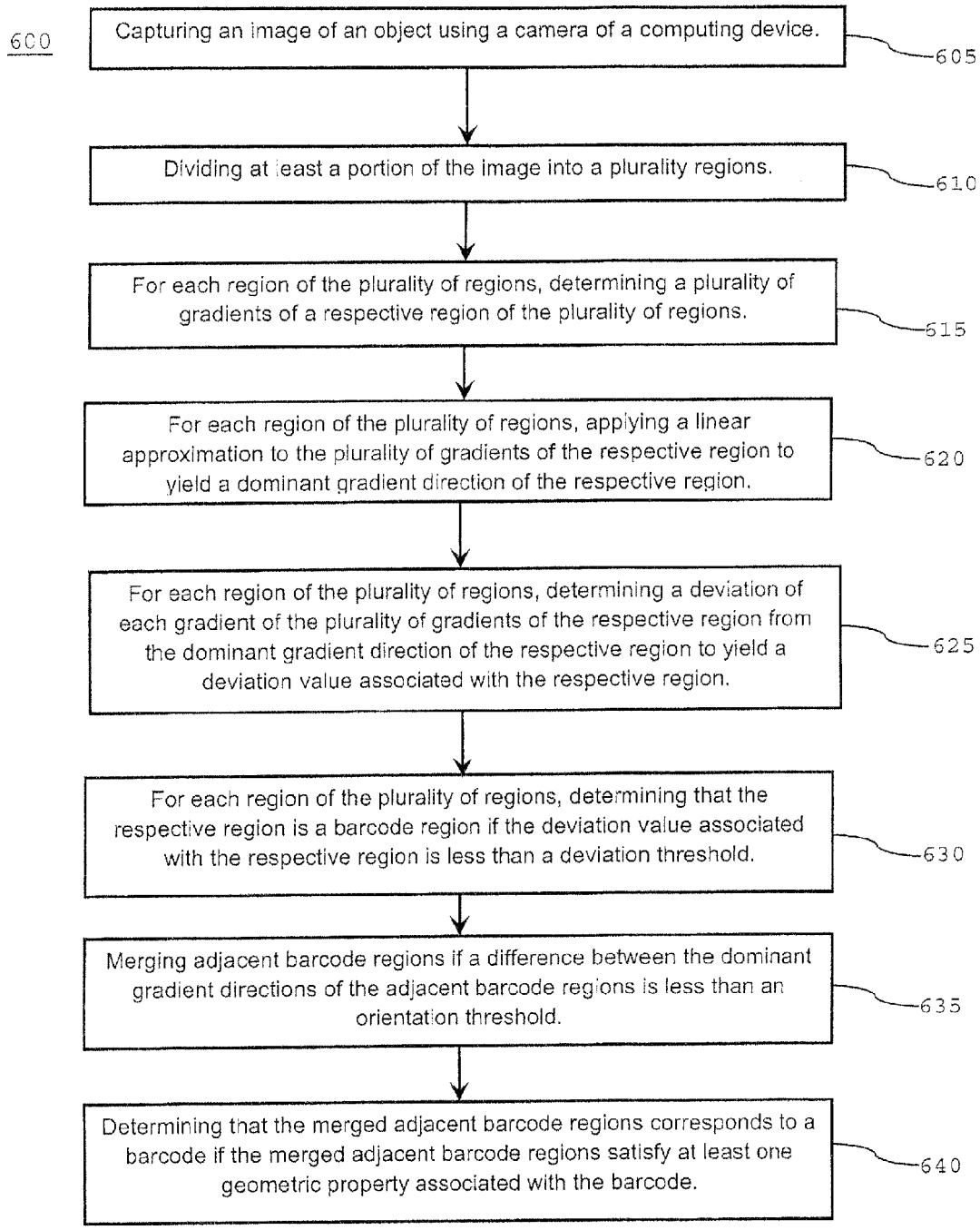
FIG. 6 is a flow chart of a method of detecting objects in images using image gradients, in accordance with another example embodiment of the present technology.

FIGS. 5-6 are flow charts of example embodiments of methods of detecting objects (such as predetermined objects) in images based at least in part on image gradients. The method 500, 600 illustrated in FIGS. 5-6 are provided by way of example, as there are a variety of ways to carry out the method. Additionally, while the example methods 500, 600 are illustrated with a particular order of steps, those of ordinary skill in the art will appreciate that FIGS. 5-6 and the steps illustrated therein can be executed in parallel (e.g., at the same time) or in any order that accomplishes the technical advantages of the present disclosure and can include fewer or more steps than illustrated.

Each block shown in FIGS. 5-6 represents one or more processes, methods or subroutines, carried out in one example method 500, 600. The steps illustrated in FIGS. 5-6 can be implemented in a system including a mobile electronic device, such as a camera phone, a smartphone, a tablet computer, or any other electronic device configured to capture images. The flow charts illustrated in FIGS. 5-6 will be described in relation to and make reference to an electronic device 400 illustrated in FIG. 4 and a predetermined object that is a barcode as illustrated in FIGS. 7-12. Those of ordinary skill in the art will appreciate however, that the predetermined object can be any other predetermined object, such as text or a QR code.

FIG. 5 is a flow chart of one example of a method of detecting objects in an image using image gradients. In FIG. 5, the method 500 can begin at block 505. At block 505, a determination can be made that at least one region of an image 700 (shown in FIG. 7) is a candidate region based at least in part on a dominant gradient direction of the region. The determination at block 505 can be made by the processor 410 of the electronic device 400, one or more processors or processing systems communicatively coupled to the electronic device, the processor 410 of the electronic device as controlled by the object-detection module 420 (including the dominant-gradient detection module 430), or one or more computing systems communicatively coupled to the electronic device 400. As described above, the image 700 can be divided into a plurality of regions 710 (shown in FIG. 7). Each region 710 can include a plurality of pixels from which the gradients 900 (shown in FIG. 9) of the respective region can be detected and determined. A dominant gradient direction 905 (shown in FIG. 9) for each region 710 can be determined from the gradients 900 of the respective region 710. Based on the dominant gradient direction 905, the respective region 710 can be determined as being a candidate region for corresponding to a predetermined object such as a barcode.

For example, in at least one embodiment, at block 505, where the image has been divided into a plurality of regions 710 and each region 710 comprises a plurality of pixels, determining that at least one region of the image is a candidate region can include determining a gradient 900 for at least a portion of the plurality of pixels. That is, for a portion of the plurality of pixels, a gradient 900 can be determined for each pixel. For example, the gradient-detection module 425 can determine the gradients 900 for the pixels of the respective region. In other embodiments, a gradient can be determined for every other pixel, every three pixels, every five pixels, or for any number of pixels of the respective region 710. That is, fewer pixels can be sampled or analyzed to increase processing speed, or more pixels can be sampled or analyzed to increase accuracy of the detection of a predetermined object. Based on the gradients of the sampled or analyzed pixels, a determination can then be made as to whether a pixel is an edge pixel. For example, if the gradient of the respective pixel is greater than or equal to a gradient threshold, the pixel can be identified as an edge pixel. In another embodiment, a maximum and minimum intensity level of the respective pixel can be stored or used to determine whether the pixel is an edge pixel or whether the respective region containing the pixel corresponds to a predetermined object.

A dominant gradient direction can be determined based on the identified or determined edge pixels of the region 710. For example, the dominant gradient direction can be determined based at least in part on a line fitted to the edge pixels of the respective region. That is, the line to which the edge pixels of the respective region fit can represent the dominant gradient direction of the region. The line can also be fitted to a direction of the edge pixels of the respective region. In at least one embodiment, a deviation of each edge pixel from the line representing the dominant gradient direction can be determined. The determined deviations can yield a deviation value associated with the respective region. The region can be identified as a candidate region based at least in part on the deviation value. For example, the region can be identified as a candidate region if the deviation value of the region is less than a deviation threshold. If the deviations are greater than the deviation threshold, the region can be identified as a non-candidate region. If the region is identified as a non-candidate region, the non-candidate region can be excluded from further image processing associated with determining whether the region corresponds to a predetermined object.

Figure 9:
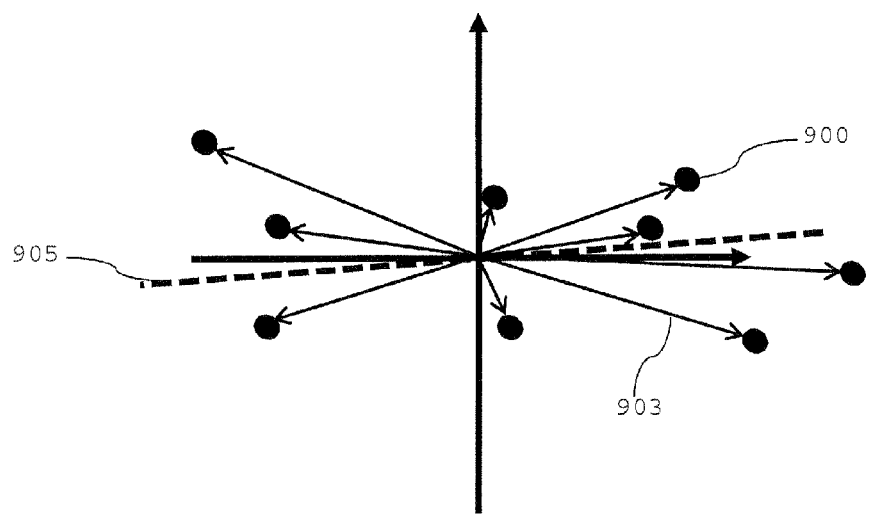
FIG. 9 is an illustration of a region of an image including the gradients, gradient vectors, and dominant gradient direction thereof.

In another embodiment, the dominant gradient direction 905 can be determined as the line fitted to gradient vectors 903 associated with each pixel of a respective region. For example, the gradient of each pixel can be a gradient vector 903. The gradient vector 903 can be treated as a point 900. A line 905 can then be fitted (for example, by a line fitting algorithm) to the points 900 representing the gradient vectors 903 of the respective region containing the gradient vectors 903, for example as illustrated in FIG. 9. The line can represent the dominant gradient direction 905 of the respective region containing the gradient vectors 903. A deviation of each of the gradient vectors 903 from the dominant gradient direction 905 can be determined. For example, the deviation can be an angular deviation of the gradient vector 903 from the dominant gradient direction 905. These deviations can be compared to a deviation threshold. If the deviations of the gradient vectors 903 are below or less than the deviation threshold, the respective region containing the gradient vectors 903 can be identified as a candidate region. That the deviations of the gradient vectors 903 are less than the deviation threshold can represent that the orientation of the gradients is substantially constant in the direction of the dominant gradient line. This can be characteristic of a predetermined object such as a barcode, QR code, or text. If the deviations are greater than the deviation threshold, the region can be identified as a non-candidate region. Non-candidate regions can be excluded from further image processing associated with determining whether the region corresponds to a predetermined object.

In another embodiment, at block 505, the determination that a region of the image is a candidate region can be further based on a maximum and minimum intensity value of the pixels of the associated region. For example, the maximum and minimum intensities of the pixels can be used to compute a contrast value of the region. The contrast value can then be compared to a contrast threshold. If the contrast value of the region is greater than or equal to the contrast threshold, the region can be determined to be a candidate region. Alternatively, if the contrast value is less than the contrast threshold, the region can be identified as a non-candidate region. Non-candidate regions can be excluded from further image processing associated with determining whether the region corresponds to a predetermined object.

In still another embodiment, at block 505, the determination that a region of the image is a candidate region can be further based on a gradient energy (for example, a mean gradient energy) of the associated region. The gradient energy can then be compared to a gradient energy threshold. If the gradient energy of the region is greater than or equal to the gradient energy threshold, the region can be determined to be a candidate region. Alternatively, if the gradient energy is less than the gradient energy threshold, the region can be identified as a non-candidate. Non-candidate regions can be excluded from further image processing associated with determining whether the region corresponds to a predetermined object.

After at least a portion of the regions have been determined to be candidate regions, the method 500 can proceed to block 510.

Figure 10:
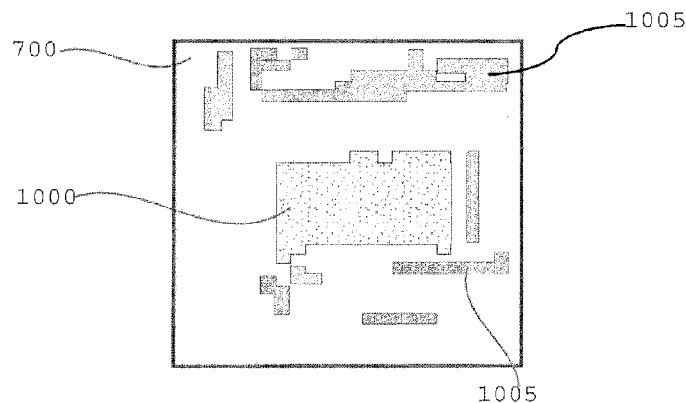
FIG. 10 is an illustration of an image showing a plurality of connected regions determined by the method of detecting objects in images using image gradients, in accordance with an example embodiment of the present technology.
Figure 11:
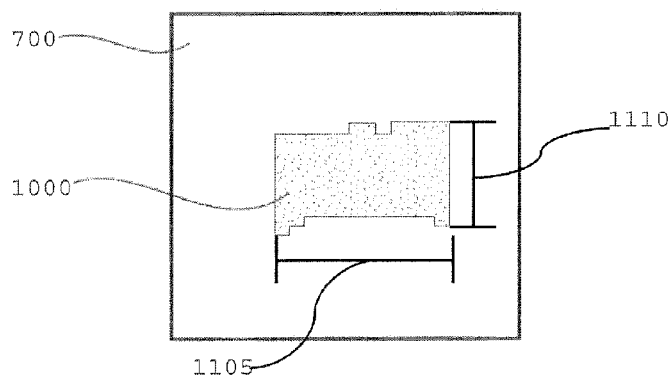
FIG. 11 is an illustration of an image showing a candidate connected region in which the non-candidate connected regions have been excluded by the method of detecting objects in images using image gradients, in accordance with an example embodiment of the present technology.

At block 510, the candidate regions that are adjacent to one another (that is, adjacent candidate regions) that satisfy a connection criterion can be connected to yield a connected region (for example, as illustrated in FIGS. 10 and 11). The candidate regions can be connected by the processor 410 of the electronic device 400, one or more processors or processing systems communicatively coupled to the electronic device, the processor 410 of the electronic device as controlled by the object-detection module 420 (including the merging module 435), or one or more computing systems communicatively coupled to the electronic device 400. The connection criterion can be a dominant orientation threshold. Satisfying the dominant orientation threshold can include determining or calculating a difference between the associated dominant gradient directions of adjacent candidate regions. If the difference between the associated dominant gradient directions is less than the dominant orientation threshold, the adjacent candidate regions can be connected. That the difference between the associated dominant gradient directions is less than the dominant orientation threshold can indicate that the adjacent regions correspond to the same object, such as a predetermined object that can be a barcode, a QR code, or text. If the difference between the associated dominant gradient directions is greater than the dominant orientation threshold, the adjacent candidate regions will not be connected or merged. That the adjacent candidate regions are not connected or merged can indicate that the adjacent regions are not likely to correspond to the same object. The method 500 can continue to build upon the connected region with subsequent adjacent regions by comparing the dominant gradient directions of a subsequent adjacent region and the connected region to determine whether to connect or merge the subsequent region with the connected region. When no further subsequent regions can be connected to the connected region, the method 500 can proceed to block 515.

At block 515, a determination can be made that the connected region corresponds to a predetermined object if the connected region satisfies a geometric property of the predetermined object (for example, as illustrated in FIG. 13). The determination can be made by the processor 410 of the electronic device 400, one or more processors or processing systems communicatively coupled to the electronic device, the processor 410 of the electronic device as controlled by the object-detection module 420, or one or more computing systems communicatively coupled to the electronic device 400. The geometric property of the predetermined object can be a shape, an area, a length, a width, a size, an aspect ratio, a ratio of a length to a width, orientations of a first dominant gradient direction with a second dominant gradient direction of the connected region, or any other geometric property associated with a predetermined object. For example, for a predetermined object that is a barcode, the geometric property can be a rectangular shape; a characteristic that a ratio of a length to the width is approximately 1.3 (for example, within a tolerance of 1.3, a ratio centered around an average of 1.3, a ratio that indicates that the length can is at least or approximately three times that of the width); a characteristic that a first dominant gradient direction associated with a first portion of regions of the connected region is substantially co-linear with a second dominant gradient direction associated with a second portion of regions of the connected region; or characteristic that a first portion of dominant gradient directions being oriented one-hundred-eighty degrees with respect to a second portion of the dominant gradient directions of the regions of the connected region. The connected region can be identified as corresponding to a barcode if the connected region is substantially rectangular in shape. In another embodiment, the connected region can be identified as a barcode if a ratio of a length of the connected region to a width of the connected region is approximately 1.3 within a predetermined deviation tolerance (for example, +/−0.1, +/−0.001, +/−0.01, or any other deviation tolerance).

In another example, for a predetermined object that is a QR code, the geometric property can be a substantially square shape; a characteristic that a length that is equal to a width of the connected region; a characteristic that a predetermined area whose value is twice the length or width of the connected region; a characteristic that a first dominant gradient direction associated with a first portion of regions of the connected region is substantially perpendicular to a second dominant gradient direction associated with a second portion of regions of the connected region; or a characteristic that a first portion of dominant gradient directions being greater than ninety-degrees but less than one-hundred-eighty degrees with respect to a second portion of the dominant gradient directions of the regions of the connected region. The connected region can be identified as corresponding to a QR code if the connected region is substantially square in shape. In another embodiment, the connected region can be identified as a QR code if a length of the connected region is substantially equal to a width of the connected region.

For a predetermined object that is text, the text can have geometric properties such as a substantially square shape; a substantially rectangular shape; a substantially triangular shape; a characteristic that a first dominant gradient direction associated with a first portion of regions of the connected region is substantially co-linear with a second dominant gradient direction associated with a second portion of regions of the connected region; a characteristic that a first portion of dominant gradient directions being oriented one-hundred-eighty degrees with respect to a second portion of the dominant gradient directions of the regions of the connected region; or any other geometric property associated with text. The connected region can be identified as text if a first dominant gradient direction associated with a first portion of regions of the connected region is substantially co-linear with a second dominant gradient direction associated with a second portion of regions of the connected region.

After the connected region has been determined to correspond to a predetermined object, the image can be sent to a decoding module corresponding to the predetermined object of the connected region. For example, if the connected region is determined to correspond to a barcode, the image can be sent to a barcode decoding module to decode information associated with the barcode. Similarly, if the connected region is determined to correspond to text, the image can be sent to a text decoding module (for example, an OCR module) to decipher the text corresponding to the connected region.

With such a method of detecting objects in an image using image gradients, as the image is analyzed on a region-by-region basis using image gradients and the regions are merged based on information derived from the image gradients, predetermined objects contained in the image can be efficiently and quickly identified and sent to the appropriate decoding modules to quickly process the information associated with the predetermined objects. That is, the presently disclosed method of detecting objects in an image using image gradients provides for a computationally efficient and robust method for detecting and localizing predetermined objects at any orientation and at various ranges of scales.

FIG. 6 is a flow chart for a second non-limiting example of a method of detecting objects in an image using image gradients. In FIG. 6, the method 600 can being at block 605. At block 605, an image of a subject can be captured. For example, the image can be captured using a camera 405 of an electronic device 400. After an image is captured by the electronic device, the method 600 can proceed to block 610.

At block 610, at least a portion of the image can be divided into a plurality of regions. For example, the processor 410 of the electronic device 400, one or more processors or processing systems communicatively coupled to the electronic device, the processor 410 of the electronic device as controlled by the object-detection module 420, or one or more computing systems communicatively coupled to the electronic device 400 can divide the at least a portion of the image into a plurality of regions. After at least a portion of the image has been divided into a plurality of regions, the method 600 can proceed to block 615.

At block 615, for each region of the plurality of regions, a plurality of gradients can be determined or detected. For example, the determination or detection can be made by the processor 410 of the electronic device 400, one or more processors or processing systems communicatively coupled to the electronic device, the processor 410 of the electronic device as controlled by the object-detection module 420 (including the gradient-detection module 425), or one or more computing systems communicatively coupled to the electronic device 400. The gradients can be determined similarly as discussed with respect to block 505 of FIG. 5. After the gradients of the regions have been determined or detected, the method 600 can proceed to block 620.

At block 620, for each region, a linear approximation can be applied to the plurality of gradients of the respective region. For example, the linear approximation can be applied by processor 410 of the electronic device 400, one or more processors or processing systems communicatively coupled to the electronic device, the processor 410 of the electronic device as controlled by the object-detection module 420 (including the dominant-gradient-direction module 430), or one or more computing systems communicatively coupled to the electronic device 400. The line to which the gradients of the respective region fit can represent a dominant gradient direction of the respective region. After the dominant gradient direction of the respective region is determined, the method 600 can proceed to block 625.

At block 625, a deviation of each gradient of the plurality of gradients of the respective region from the dominant gradient direction of the respective region can be determined. For example, the determination can be made by the processor 410 of the electronic device 400, one or more processors or processing systems communicatively coupled to the electronic device, the processor 410 of the electronic device as controlled by the object-detection module 420, or one or more computing systems communicatively coupled to the electronic device 400. The determined deviations can yield a deviation value associated with the respective region. The deviation value can be used to identify whether the respective region is a candidate region or a non-candidate region, similar to the method 500 in FIG. 5. After the deviation value is determined, the method 600 can proceed to block 630.

At block 630, a determination that the respective region is a barcode region can be made. For example, the determination can be made by the processor 410 of the electronic device 400, one or more processors or processing systems communicatively coupled to the electronic device, the processor 410 of the electronic device as controlled by the object-detection module 420, or one or more computing systems communicatively coupled to the electronic device 400. In at least one embodiment, the respective region can be identified as a barcode region if the deviation value associated with the respective region is less than a deviation threshold. If the deviation value is greater than a deviation threshold, the respective region can be identified as a non-barcode region and can be excluded from further image processing to determine if the image contains a predetermined object. After the regions of the plurality of regions of the image have been identified as being barcode regions or non-barcode regions, the method can proceed to block 635.

At block 635, adjacent barcode regions can be merged. For example, the merging can be made by the processor 410 of the electronic device 400, one or more processors or processing systems communicatively coupled to the electronic device, the processor 410 of the electronic device as controlled by the object-detection module 420 (including the merging module 435), or one or more computing systems communicatively coupled to the electronic device 400. In at least one embodiment, adjacent barcode regions can be merged if a difference between the dominant gradient directions of the adjacent barcode regions is less than an orientation threshold. Subsequent adjacent regions can be merged with the merged adjacent barcode region if the differences between the dominant gradient directions of the subsequent adjacent barcode regions and the merged adjacent barcode region are less than an orientation threshold. When no more subsequent regions can be merged with the merged adjacent barcode region, the method 600 can proceed to block 640.

At block 640, a determination can be made that the merged adjacent region corresponds to a barcode. For example, the determination can be made by the processor 410 of the electronic device 400, one or more processors or processing systems communicatively coupled to the electronic device, the processor 410 of the electronic device as controlled by the object-detection module 420, or one or more computing systems communicatively coupled to the electronic device 400. For example, the merged adjacent region can be identified as a barcode if the merged adjacent barcode regions satisfy at least one geometric property associated with the barcode. The geometric properties associated with the barcode can be similar to those described in relation to FIG. 5. After the merged adjacent region has been identified as being a barcode, the image can be sent to an appropriate barcode decoding module, similar to that described in relation to FIG. 5.

Figure 7:
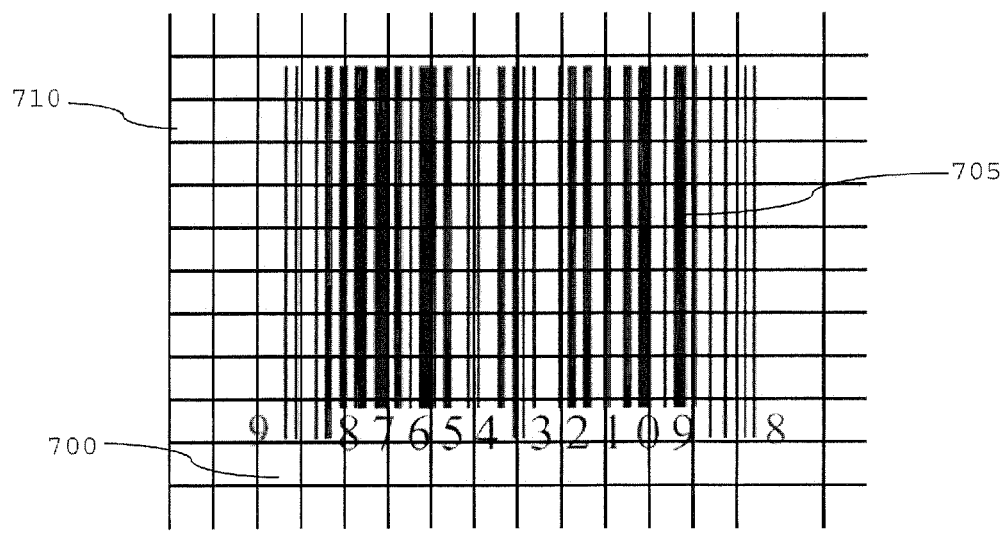
FIG. 7 is an illustration of an image divided into a plurality of regions.

FIG. 7 illustrates an image 700 having a predetermined object that is a barcode 705. In FIG. 7, the image 700 has been divided into a plurality of regions 710. In FIG. 7, each region 710 of the plurality of regions can be a predefined size. For example, the regions 710 can be a ten pixel-by-ten pixel region, a twenty pixel-by-twenty pixel region, or any other sized region. Those of ordinary skill in the art will appreciate that the regions 710 can be of any size that is large enough to be expected to cover multiple barcode bars, text letters, QR code portions of predetermined objects but small enough that multiple regions cover the barcode, QR code, or text line. Additionally, those of ordinary skill in the art will appreciate that if the speed of detecting predetermined objects in an image is a priority, larger sized regions can be used. With larger sized regions, a coarse estimate of the location of a barcode or other predetermined object can be made. However, if the accuracy of detecting predetermined objects in an image is a priority, smaller sized regions can be used. With smaller sized regions, a more accurate identification of the location of a barcode or other predetermined object, but the identification can take longer than if larger sized regions are used.

Figure 8:
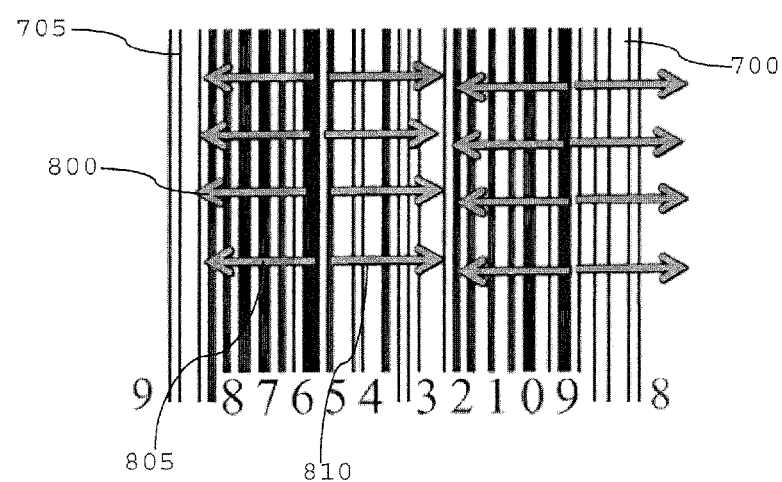
FIG. 8 is an illustration of an image having a barcode, where the dominant gradient directions are provided.

FIG. 8 illustrates the image 700 and the determined dominant gradient directions 800 of the plurality of regions 710 (not shown) of the image. In FIG. 8, the gradient directions 800 illustrate the direction of high intensity to low intensity of the image. As illustrated in FIG. 8, the dominant gradient directions 800 are substantially constant in a first direction 805 and a second direction 810 that is one-hundred-eighty degrees to the first direction 805. Such dominant gradient directions 800 correspond to the alternating black-white-black-white bars of a barcode 705. Thus, by determining the dominant gradient directions 800 of regions of an image, a determination can be made as to whether the regions correspond to predetermined objects such as barcodes.

FIG. 9 illustrates a determination of a dominant gradient direction 905 of one region of an image. In FIG. 9, a plurality of gradients 900 of the region are identified. The gradients 900 can correspond to edge pixels of the region. The dominant gradient direction 905 can be a linear approximation of the gradients 900 of the region. That is, the dominant gradient direction 905 can be represented by a line fitted to the gradients 900 of the region. Also illustrated in FIG. 9 are gradient vectors 903 corresponding to the gradients 900 of the region. The gradient vectors 903 can be used to determine a deviation value of the region, which can be utilized to determine whether the region is a candidate region (or a barcode region) as discussed above in relation to FIGS. 5 and 6. As discussed above, the deviation of the gradient vectors 903 from the dominant gradient direction 905 can indicated whether the region is a candidate region. For example, for barcode regions, the gradient vectors 903 are less likely to deviate from the dominant gradient direction 905, as barcodes 705 (shown in FIG. 7) have alternating black and white bars that result in a substantially linear dominant gradient direction. For predetermined objects that are QR codes or text, the deviations of the gradient vectors can increase. To accommodate for this, the gradient vectors themselves or the angles of deviation of the gradient vectors with respect to the dominant gradient direction can be placed in a histogram. Then, the distance between the histogram and a known histogram associated with the predetermined object (the QR code or text) can be calculated or determined. If the distance is below a threshold, a determination can be made that the region is a candidate region for a QR code or text, depending on the known histogram used.

FIG. 10 is an illustration of an image 700 in which the candidate regions have been connected to yield a connected region 1000 (or a merged region or merged adjacent regions). Also illustrated in FIG. 10 are other connected regions 1005. The other connected regions 1005 can correspond to other objects in the image 700 having substantially similar dominant gradient directions for the regions thereof, but the difference between dominant gradient direction of the other connected regions 1005 and the dominant gradient direction of the connected region 1000 exceed a connecting criterion or merging threshold such that the other connected regions 1005 are not merged with the connected region 1000. That is, the other connected regions 1005 are determined to be dissimilar or different from the connected region 1000. For example, the other connected regions are determined to correspond to an object different from that corresponding to the connected region 1000.

FIG. 11 is an illustration of the image 700 illustrated in FIG. 10, but the other connected regions 1005 have been excluded from being considered as corresponding to a predetermined region such as a barcode, QR code, or text. That is, as illustrated in FIG. 11, only one connected region 1000 is identified as possibly corresponding to a predetermined object. In FIG. 11, the connected region 1000 can be compared to at least one geometric property of a predetermined object. For example, in FIG. 11, the predetermined object can be a barcode. In such an embodiment, the connected region 1000 can be analyzed to determine a length 1105 of the connected region 1000 and a width 1110 of the connected region 1000. A ratio of the length 1105 to the width 1110 can be analyzed to determine if the ratio is approximately 1.3, which can be a geometric property of the barcode. In another embodiment, a determination can be made that the connected region 1000 has a substantially rectangular shape similar to that of a barcode. In FIG. 11, the connected region 1000 has a substantially rectangular shape and can be identified as a barcode. The image can then be decoded by a barcode decoding module to decode the information associated with the region indemnified as a barcode, for example as illustrated in FIG. 12.

Figure 12:
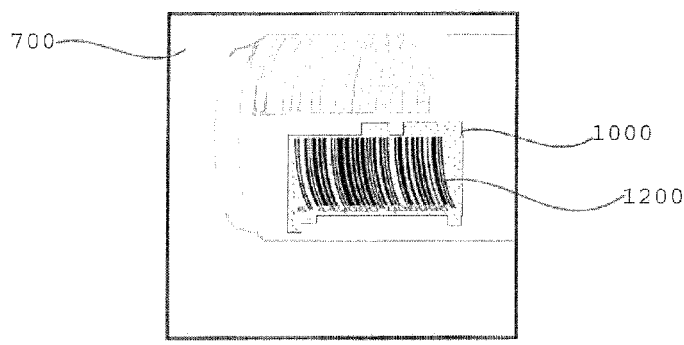
FIG. 12 is an illustration of an image showing that the candidate connected region corresponds to a predetermined object that is a barcode.

FIG. 12 is an illustration of the image illustrated in FIG. 11 illustrating that the connected region 1000 corresponds to a barcode 1200.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device.

Embodiments of the present disclosure may be provided as a computer program product including a nontransitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be Internet download.

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of detecting a barcode in an image, the method comprising:
   under control of one or more computer systems configured with executable instructions,
   capturing an image of a subject using a camera of an electronic device;
   dividing at least a portion of the image into a plurality regions;
   for each region of the plurality of regions,
   determining a plurality of gradients of a respective region of the plurality of regions;
   applying a linear approximation to the plurality of gradients of the respective region to yield a dominant gradient direction of the respective region;
   determining a deviation of each gradient of the plurality of gradients of the respective region from the dominant gradient direction of the respective region to yield a deviation value associated with the respective region;
   determining that the respective region is a barcode region if the deviation value associated with the respective region is less than a deviation threshold;
   merging adjacent barcode regions if a difference between the dominant gradient directions of the adjacent barcode regions is less than an orientation threshold; and
   determining that the merged adjacent barcode regions corresponds to a barcode if the merged adjacent barcode regions satisfy at least one geometric property associated with the barcode.

2. The method of claim 1, further comprising converting the image into a grayscale image.

3. The computer-implemented method as recited in claim 1, wherein if the difference between the dominant gradient directions of the adjacent barcode regions is at least equal to or greater than the orientation threshold, the adjacent barcode regions are not merged.

4. The computer-implemented method as recited in claim 1, wherein the at least one geometric property of the barcode comprises at least one of: a rectangular shape or a predetermined area measurement.

5. The computer-implemented method as recited in claim 1, wherein the merged adjacent barcode regions satisfy the rectangular shape if a ratio of a length of the merged barcode regions to a width of the merged barcode regions is within a tolerance of 1.3.

6. A computer-implemented method comprising:
   under control of one or more computer systems configured with executable instructions,
   determining that at least one region of an image is a first candidate region based at least in part on a dominant gradient direction of the first candidate region;
   connecting candidate regions in the image that satisfy a connection criterion to yield a connected region, wherein connecting the first candidate region and a second candidate region includes determining that a difference between the dominant gradient direction of the first candidate region and a dominant gradient direction of the second candidate region satisfies a threshold; and
   determining that the connected region corresponds to a predetermined object if the connected region satisfies a geometric property of the predetermined object.

7. The computer-implemented method of claim 6, wherein the predetermined object of the image is one of a barcode, a quick response (QR) code, and text.

8. The computer-implemented method of claim 6, wherein each region of the image comprises a plurality of pixels, and wherein determining that at least one region of the image is the first candidate region based at least in part on the dominant gradient direction of the first region comprises:
   for each region,
   determining, for a portion of the plurality of pixels of a respective region, a gradient of each pixel of the portion;
   determining that a respective pixel is an edge pixel if the gradient of the respective pixel is greater than or equal to a gradient threshold; and
   determining the dominant gradient direction of the region based at least in part on a line fitted to the edge pixels.

9. The computer-implemented method of claim 8, wherein the line fitted to the edge pixels is fitted to a direction of the edge pixels.

10. The computer-implemented method of claim 8, wherein determining that at least one region of the image is the first candidate region based at least in part on the dominant gradient direction of the region comprises:
   for each edge pixel of the respective region,
   determining a deviation of a respective gradient of the edge pixel from the dominant gradient direction to yield a deviation value associated with the respective region; and determining that the respective region is the first candidate region if the deviation value is less than a deviation threshold.

11. The computer-implemented method of claim 6, wherein
   determining that at least one region of an image is the first candidate region comprises determining that a plurality of regions are candidate regions, each candidate region having an associated dominant gradient direction;
   the connecting criterion comprises a dominant orientation threshold; and
   connecting the candidate regions that satisfy the connection criterion to yield the connected region further comprises:
      determining a difference between the associated dominant gradient directions of adjacent candidate regions; and
      connecting the adjacent candidate regions if the difference is less than the dominant orientation threshold.

12. The computer-implemented method of claim 6, wherein:
   the at least one region comprises a first portion of regions and a second portion of regions, the first portion of regions having a first dominant gradient direction, and the second portion of regions having a second dominant gradient direction;
   the predetermined object is a barcode; and
   the geometric property comprises the first dominant gradient direction being substantially co-linear with the second dominant gradient direction.

13. The computer-implemented method of claim 6, wherein:
   the at least one region comprises a first portion of regions and a second portion of regions, the first portion of regions having a first dominant gradient direction, and the second portion of regions having a second dominant gradient direction;
   the predetermined object is a quick response (QR) code; and
   the geometric property comprises the first dominant gradient direction being substantially perpendicular to the second dominant gradient direction.

14. The computer-implemented method of claim 6, wherein determining that at least one region of an image is the first candidate region further comprises:
   for each region,
      determining whether a contrast value of the region is at least equal to a contrast threshold; and
      in response to determining the contrast value is at least equal to the contrast threshold, determining that the region is the candidate region; and
      in response to determining the contrast value is less than the contrast threshold, determining that the region is a non-candidate region and excluding the non-candidate region from being identified as the predetermined object.

15. The computer-implemented method of claim 6, wherein determining that at least one region of an image is the first candidate region further comprises:
   for each region,
      determining whether a gradient energy of the region is at least equal to a gradient energy threshold; and
      in response to determining the gradient energy being at least equal to the gradient energy threshold, determining that the region is the first candidate region; and
      in response to determining the gradient energy is less than the gradient energy threshold, determining that the region is a non-candidate region and excluding the non-candidate region from being identified as the predetermined object.

16. The computer-implemented method of claim 6, wherein the geometric property comprises a length of the connected region being longer than a width of the connected region.

17. A system for detecting objects in an image, the system comprising:
   a processor; and
   a memory device including instructions that, when executed by the processor, cause the processor to:
      determine that at least one region of the image is a first candidate region based at least in part on a dominant gradient direction of the first candidate region;
      connect candidate regions in the image that satisfy a connection criterion to yield a connected region, wherein connecting the first candidate region and a second candidate region includes determining that a difference between the dominant gradient direction of the first candidate region and a dominant gradient direction of the second candidate region satisfies a threshold; and
      determine that the connected region is a predetermined object if the connected region satisfies a geometric property of the predetermined object.

18. The system of claim 17, wherein the predetermined object of the image is one of a barcode, a quick response (QR) code, and text.

19. The system of claim 17, wherein each region of the image comprises a plurality of pixels, and determining that at least one region of the image is the first candidate region based at least in part on the dominant gradient direction of the region comprises:
   for each region,
      determining, for a portion of the plurality of pixels of a respective region, a gradient of each pixel of the portion;
      determining that a respective pixel is an edge pixel if the gradient of the respective pixel is greater than or equal to a gradient threshold; and
      determining the dominant gradient direction of the region based at least in part on a line fitted to the edge pixels.

20. The system of claim 19, wherein determining that at least one region of the image is the first candidate region based at least in part on the dominant gradient direction of the region comprises:
   for each edge pixel of the respective region,
      determining a deviation of a respective gradient of the edge pixel from the dominant gradient direction to yield a deviation value associated with the respective region; and
      determining that the respective region is the first candidate region if the deviation value is less than a deviation threshold.

21. The system of claim 17, wherein:
   determining that at least one region of an image is the first candidate region comprises determining that a plurality of regions are candidate regions, each candidate region having an associated dominant gradient direction;
   the connecting criterion comprises a dominant orientation threshold; and
   connecting the candidate regions that satisfy the connection criterion to yield the connected region further comprises:
      determining a difference between the associated dominant gradient directions of adjacent candidate regions; and connecting the adjacent candidate regions if the difference is less than the dominant orientation threshold.

22. A computer program product for detecting objects in an image, the program being embedded in a non-transitory computer-readable medium and including instructions that, when executed by at least one computing device, cause the at least one computing device to:
- determine that at least one region of the image is a first candidate region based at least in part on a dominant gradient direction of the first candidate region;
- connect candidate regions that satisfy a connection criterion to yield a connected region, wherein connecting the first candidate region and a second candidate region includes determining that a difference between the dominant gradient direction of the first candidate region and a dominant gradient direction of the second candidate region satisfies a threshold; and
- determine that the connected region is a predetermined object if the connected region satisfies a geometric property of the predetermined object.

23. The computer program product of claim 22, wherein each region of the image comprises a plurality of pixels, and wherein determining that at least one region of the image is the first candidate region based at least in part on the dominant gradient direction of the region comprises:
- for each region,
  - determining, for a portion of the plurality of pixels of a respective region, a gradient of each pixel of the portion;
  - determining that a respective pixel is an edge pixel if the gradient of the respective pixel is greater than or equal to a gradient threshold; and
  - determining the dominant gradient direction of the region based at least in part on a line fitted to the edge pixels.

24. The computer program product of claim 22, wherein:
- the at least one region comprises a first portion of regions and a second portion of regions, the first portion of regions having a first portion dominant gradient direction, and the second portion of regions having a second portion dominant gradient direction;
- the predetermined object is a barcode; and
- the geometric property comprises the first portion dominant gradient direction being substantially co-linear with the second portion dominant gradient direction.

25. The computer program product of claim 22, wherein the geometric property comprises a ratio of a length of the connected region to a width of the connected region being within a tolerance of 1.3.

* * * * *